(12) United States Patent
McCarty

(10) Patent No.: US 6,213,884 B1
(45) Date of Patent: Apr. 10, 2001

(54) CASE HARDENED SELF-DRILLING, SELF-TAPPING, SELF-PIERCING FASTENERS AND PROCESS FOR MAKING THE SAME

(75) Inventor: Eric McCarty, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/421,849

(22) Filed: Oct. 20, 1999

(51) Int. Cl.⁷ ........................................ B21H 3/02
(52) U.S. Cl. .......................... 470/17; 470/8; 470/10; 470/11
(58) Field of Search ................ 470/8, 9, 10, 11, 470/12, 17

(56) References Cited

U.S. PATENT DOCUMENTS

| | | | |
|---|---|---|---|
| 3,877,281 | * 4/1975 | Shimizu et al. ................ | 470/17 |
| 3,949,641 | 4/1976 | Masuda ............................. | 85/41 |
| 3,968,533 | 7/1976 | Zentner .............................. | 10/2 |
| 3,972,084 | 8/1976 | Reynolds ........................ | 10/10 R |
| 4,023,224 | * 5/1977 | Frailly ............................ | 470/17 |
| 4,037,281 | 7/1977 | Reynolds ........................ | 10/10 R |
| 4,292,007 | 9/1981 | Wagner ........................... | 411/156 |
| 4,878,793 | 11/1989 | Hewison ......................... | 411/387 |
| 4,966,024 | 10/1990 | Hewison ......................... | 72/88 |
| 5,700,120 | * 12/1997 | Manning et al. ................. | 470/17 |
| 6,017,274 | * 1/2000 | Sherman et al. .................. | 470/8 |

\* cited by examiner

Primary Examiner—Ed Tolan
(74) Attorney, Agent, or Firm—Marc Lorelli

(57) ABSTRACT

A method for heat treating a metal article such as a fastener comprising the step of case hardening the fastener in a gas carborizing atmosphere at a temperature of about 1700° F. or in a carbonitriding atmosphere at a temperature of about 1550° F., and quenching the fastener in water or oil and tempering the fastener at a minimum temperature of 770° F. for approximately one hour.

13 Claims, 4 Drawing Sheets

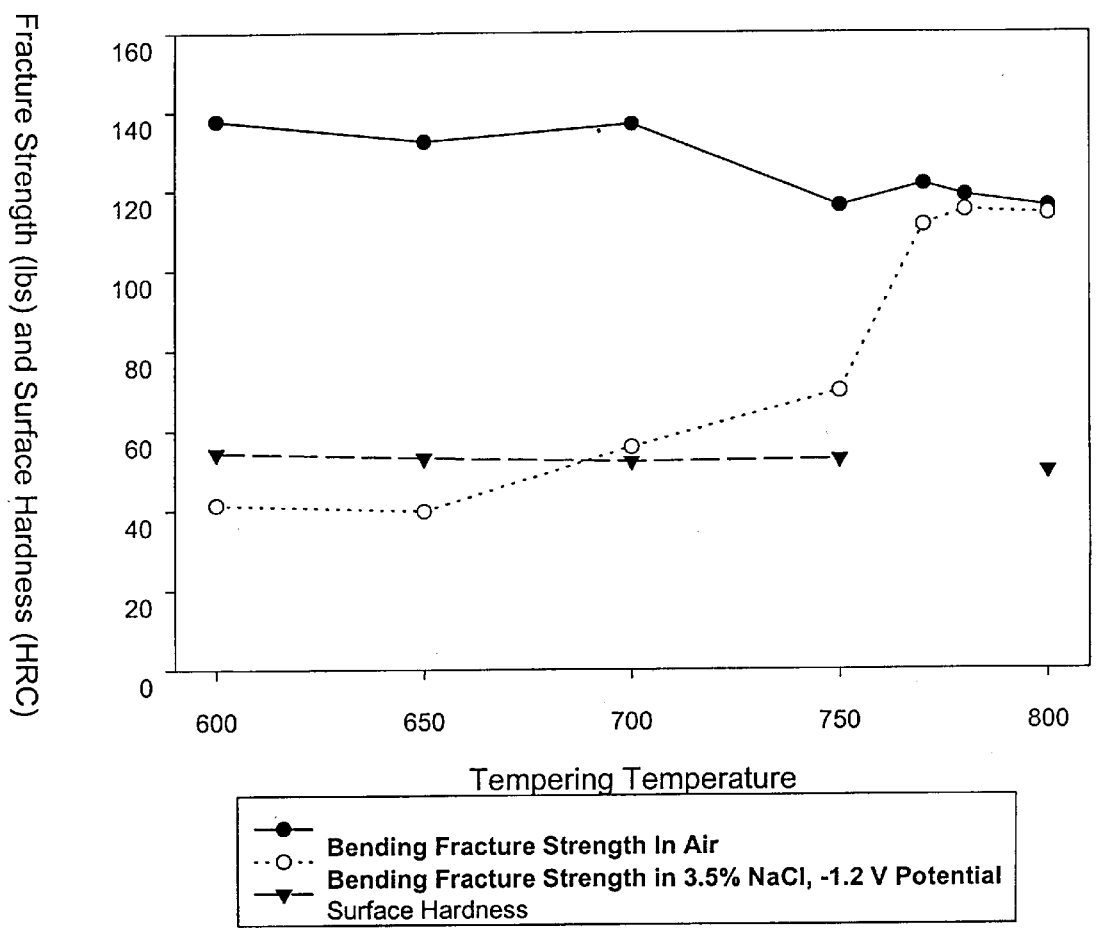
Figure 4: 10B21 Case Hardened Fasteners Tempering Temperature vs. Fracture Strength, SCC Susceptibility and Surface Hardness

CASE HARDENED SELF-DRILLING, SELF-TAPPING, SELF-PIERCING FASTENERS AND PROCESS FOR MAKING THE SAME

FIELD OF THE INVENTION

This invention relates to a process for making fasteners and more particularly to a process for making plated, case hardened, self-drilling, self-piercing and self-tapping screws where the screw has been specially heat treated. The invention also relates to the product resulting from the hardening process.

BACKGROUND OF THE INVENTION

Case hardened self-drilling, self-piercing and self-tapping screws are often used to reduce fastener joint complexity and fastener assembly. Self-drilling screws have point and thread configurations that allow the screws to cut threads into the mating materials. Self-piercing screws have point configurations that allow the screws to form their own pilot holes and then tap or cut threads into a mating component. Self-tapping screws, also referred to as thread forming screws, have point and thread configurations that allow the screws to form threads in mating components. These screws simplify the assembly process and provide economic benefits by eliminating the need for pre-drilled and pre-threaded holes, by helping to align fastener joints during assembly, and by reduced fastener joint packaging space.

There are many industrial applications where case hardened fasteners can be used to provide economic cost savings. A common usage of case hardened fasteners is in the assembly of thin sheet metal components such as the mounting of body panels to the frame of vehicles and the assembly of paneling to the structural components of a building. Case hardened screws are used in many industries such as appliance, automotive, aerospace, as well as others.

In order for self-tapping, self-drilling and self-piercing fasteners to perform the their intended functions, the surface hardness of the threads must be harder than the materials into which threads are being cut or formed. Typically, case hardened fasteners have been manufactured from steel which is case hardened by carbonnitriding or, less commonly, gas carburizing. This produces a fastener with a hardened steel surface, referred to as the "case," and a less hard, more ductile core. The hardened surface extends to a specified depth, which depends on the diameter of the fastener, and typically has a hardness greater than 45 HRC. The core hardness typically ranges from 28 to 39 HRC.

Many of the above applications for case hardened fasteners involve long term exposure to corrosive environments. The process for making self-tapping metal screws, in particular, customarily includes the step of plating the screws with a corrosion resistant barrier or sacrificial metal layer coatings after the hardening operation. Prior to plating, fasteners are cleaned of heat treat scale, oil and contaminants using either acid or caustic cleaning baths. The type of coating and the process in which a coating is applied depends on the desired corrosion resistance, cosmetic appearance, electrical conductivity, and friction characteristics. Coatings can be applied after cleaning by one of several methods including, but not limited to electroplating, mechanical plating, dip-spinning, and spraying.

Unfortunately, when hardened steel is either acid cleaned or electroplated it can become embrittled through a process called "hydrogen embrittlement." Hydrogen embrittlement is a process of time dependent subcritical crack formation and crack growth resulting from the cooperative interaction between static stress and hydrogen. The susceptibility of steel to hydrogen embrittlement has typically been related to increasing hardness, stress and the amount of hydrogen available for diffusion to tri-axial stresses. Case hardened fasteners are particularly susceptible to hydrogen embrittlement due to their high surface hardness and their processing under traditional manufacturing methods. The formation and growth of cracks due to hydrogen embrittlement typically result in the separation of the head of the fastener from the shank or threads and can occur within minutes or days after assembly.

In order to relieve the hydrogen embrittlement and reduce the danger of cracking, standard specifications call for electroplated fasteners to be baked, heat treated for 4 to 24 hours at 400° F. within one hour of electroplating. Baking is not always completely successful in relieving the hydrogen embrittlement and adds cost to fasteners. A more certain method for preventing hydrogen embrittlement is therefore needed.

Hardened steel fasteners that are susceptible to hydrogen embrittlement are also susceptible to "stress corrosion cracking", also referred to as "environmentally assisted hydrogen embrittlement". Stress corrosion cracking of fasteners is similar to hydrogen embrittlement in that hydrogen is involved in embrittling the steel. However, in stress corrosion cracking, hydrogen is supplied by the corrosion reaction between the steel surface, the sacrificial coating and the environment. As with hydrogen embrittlement, fastener failure occurs some time after assembly and can vary from minutes to any time during the lifetime of the fastener. There are no known methods of relieving stress corrosion cracking susceptibility.

Soft steels are typically not as susceptible to hydrogen embrittlement. Unfortunately, soft steels do not contain a sufficient hardness to cut, pierce and form threads as self-drilling, self-piercing, or self-tapping fasteners. Any solution to prevent hydrogen embrittlement and stress corrosion cracking in self-tapping, self-piercing and self-drilling screws must address material susceptibility yet preserve the ability of the fasteners to perform their intended functions. Baking, choosing alternate coatings, and attempting to manage the fastener stress state have proved to be unreliable solutions to hydrogen embrittlement and stress corrosion cracking. The invention below describes a process and recommended materials in which self-tapping, self-piercing and self-drilling screws can be manufactured that are resistant to hydrogen embrittlement and stress corrosion cracking, yet can still perform their intended functions.

SUMMARY OF THE INVENTION

Further areas of applicability of the present invention will become apparent from the detailed description provided hereinafter. It should be understood, however, that the detailed description and specific examples, while indicating preferred embodiments of the invention, are intended for purposes of illustration only, since various changes and modifications within the spirit and scope of the invention will become apparent to those skilled in the art from this detailed description.

The present invention relates to the material selection and process of making a case hardened fastener wherein the entire fastener is subject to a special heat treating regime. It has been found that when a case hardened fastener has been subject to a specific heat treating regime, the chances of hydrogen embrittlement and stress corrosion cracking are greatly reduced. This regime calls for the tempering of the fastener at temperatures higher than those normally seen in the heat treatment of such fasteners. Whereas this reduces the chance of hydrogen embrittlement and stress corrosion cracking, it also reduces the core and case hardness of the material.

The method for producing the case hardened fastener of the current invention consists of reducing wire to a working diameter, cold heading the wire into fastener blanks, followed by threading. Fasteners are then gas carburized or carbonitrided at 1700° F. and 1550° F. respectively followed by an oil or water quench. After quenching, fasteners are tempered between 600 and 770° F. for a period of one hour. The typical materials used for case hardened tapping screws include, but are not limited to, 1022, 1021, 10B22 or 10B21 steel materials. A preferred method for adjusting the susceptibility to hydrogen embrittlement and stress corrosion cracking is described.

Tempering at temperatures greater than 770° F. has been proven to reduce hydrogen embrittlement and stress corrosion cracking susceptibility for 1022 and 10B21 case hardened fasteners. Tempering at 800° F. eliminated the potential for hydrogen embrittlement and stress corrosion cracking for these same materials, as shown in FIG. 1. The results show an apparent link between hydrogen embrittlement and stress corrosion cracking to tempered martensite embrittlement. The results of this analysis can be extrapolated for like materials heat treated by carbonitriding and gas carburizing atmospheres. Like materials would encompass plain carbon steels from 1) 1000 series alloys, including but not limited to, 1021, 1022 and 1026; 2) 1500 series alloys, including but not limited to, 1518 and 1525; 3) boron steels from 10B00 series alloys, including but not limited to 10B21, 10B22 and 10B26; 4) 4000 series alloys, including but not limited to 4023, 4120; 5) 5000 series alloys, including but not limited to 5120; and 6) 8000 series alloys, including but not limited to 8620 and 8622. References to the materials are described in *Metals Handbook*, 8$^{th}$ Edition copyright 1961 by the American Society for Metals, which is herein incorporated by reference as if fully set forth herein. The exact tempering temperature in which susceptibility is eliminated depends on the material grade but can be determine using an incremental load method described in ASTM 16.24.

As previously mentioned, increasing the tempering temperature reduces the case and core hardness of the material. For standard case hardened fastener materials such as 1022 and 1021, the higher tempering temperatures can reduce the case and core hardness below that necessary for self-tapping, self-piercing and self-drilling screws to perform their intended function. The use of higher carbon plain carbon steels, boron steels, and alloyed steels increase the likelihood that case hardened fasteners tempered at higher than industry standard temperatures can achieve surface and core hardness targets. Due to economics, other than 10B21, these materials are not used currently in the manufacturing of case hardened fasteners. These new materials, when subject to the increased tempering temperature, should be able to achieve hardness targets, perform the intended function of cutting and forming threads while exhibiting no susceptibility to hydrogen embrittlement or stress corrosion cracking.

The invention accordingly comprises the several steps and the relation of one or more of such steps with respect to each of the others, and the article possessing the features, properties and the relation of elements, which are exemplified in the following detailed disclosure and scope of the invention will be indicated in the claims. For a further understanding of the invention, reference is had to the following descriptions taken in connection with the accompanying drawings.

BRIEF DESCRIPTION OF THE DRAWINGS

The present invention will become more fully understood from the detailed description and the accompanying drawings, wherein:

FIG. 4 is a chart showing stress corrosion cracking susceptibility as a function of tempering temperature 10B21 case hardened fasteners.

DETAILED DESCRIPTION OF THE PREFERRED EMBODIMENTS

The invention being thus described, it will be understood that the same may be varied in many ways. Such variations are not to be regarded as a departure from the spirit and scope of the invention, and all such modifications as would be obvious to one skilled in the art are intended to be included within the scope of the following claims.

Figure 1:
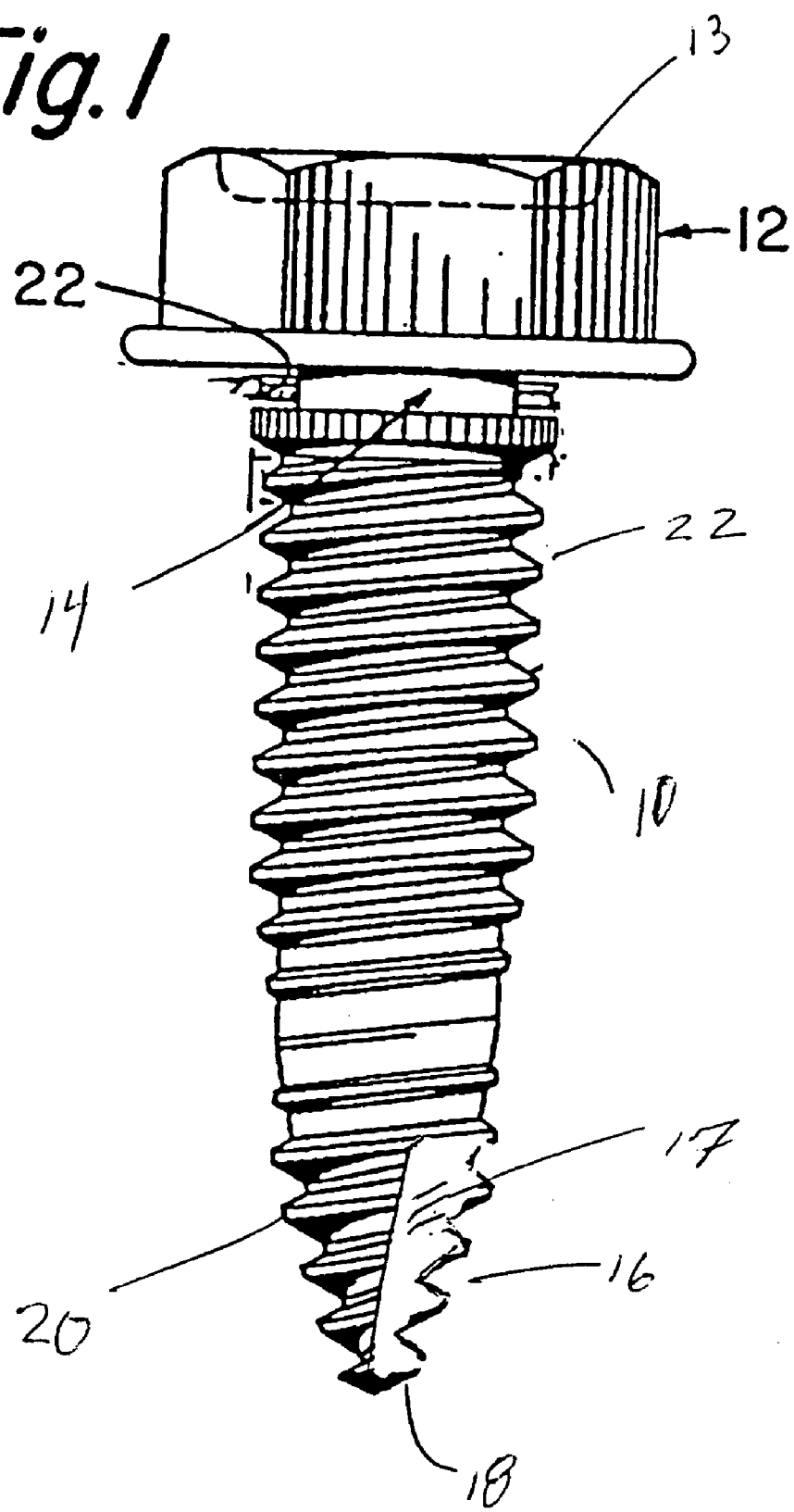
FIG. 1 is a front elevated view of a screw fastener as it appears in the final step of production of clotting and core layers of the fastener.
Figure 2:
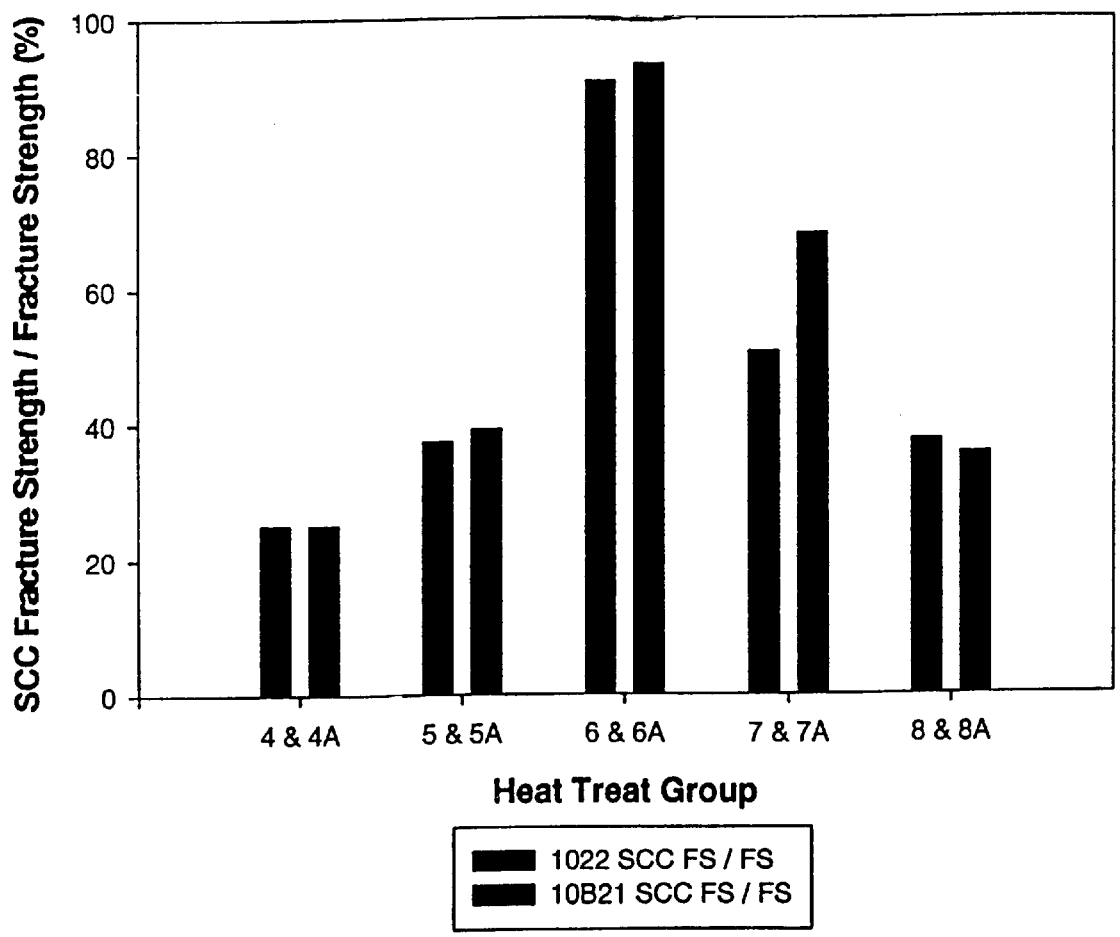
FIG. 2 is a chart showing stress corrosion cracking results for 1022 and 10B21 materials.

FIG. 1 is an enlarged front view of an exemplary fastener constructed in accordance with the teachings of the present invention. The fastener is illustrated as a self-drilling screw 10 generally including a head 12, which is customarily impressed with either a lateral or crossed (phillips head) slot 13 to facilitate engaging and driving the screw. Screw 10 also comprises a threaded shank 14 which may be either cylindrical or conical and terminates at a tip area 16. In the preferred embodiment, tip area 16 is configured as a drill comprising a pair of flutes 17 (one of which is shown) and a drill point 18.

When the screw 10 is driven into the work surface, the sharp points and cutting edges of the tip area 16 cut into the softer work surface. As the screw penetrates into the work material, the a lower portion of threads or cutting threads 20 cut mating threads into the work. This process continues with an upper portion of threads 22 on the screw 10 following the cutting threads 20 until the screw is fully seeded. The upper portion of threads 22 are substantially non-cutting threads.

In order for the tip 16 and cutting threads 20 to cut properly, they must be hardened. For cost and manufacturing reasons, the entire surface of case hardened fasteners is hardened. The high surface hardness, greater than 45R$_c$ allows case hardened fasteners to pierce holes for self-piercing fasteners, and cut or form threads for self-piercing, self-tapping and self-drilling screws. The case depth is typically defined as the depth at which the case hardness equals 45R$_c$ and can vary from 0.002 to 0.011 inches (0.051 to 0.279 mm) in depth depending on the size of the screw. To provide ductility and to prevent brittle failure during assembly, the specified core hardness range is 28 to 39R$_c$. Most specifications call for a core hardness range between 28 to 36R$_c$.

As is known, to meet this industrial standard, steel materials, such as 1021 and 1022, are case hardened in gas carburizing or carbonitriding atmospheres at about 1700° F. and 1550° F. respectively. Fasteners are then quenched in either water or oil and tempered between 600° F. to 770° F. for about an hour depending on the size an material of the fastener. The process of the present invention begins with the formation of a steel screw 10. Incoming steel wire made of 1) 1000 series alloys, including but not limited to, 1021, 1022 and 1026; 2) 1500 series alloys, including but not limited to, 1518 and 1525; 3) boron steels from 10B00 series alloys, including but not limited to 10B21, 10B22 and 10B26; 4) 4000 series alloys, including but not limited to 4023, 4120; 5) 5000 series alloys, including but not limited to 5120; and 6) 8000 series alloys, including but not limited to 8620 and 8622 is reduced in diameter.

Figure 3:
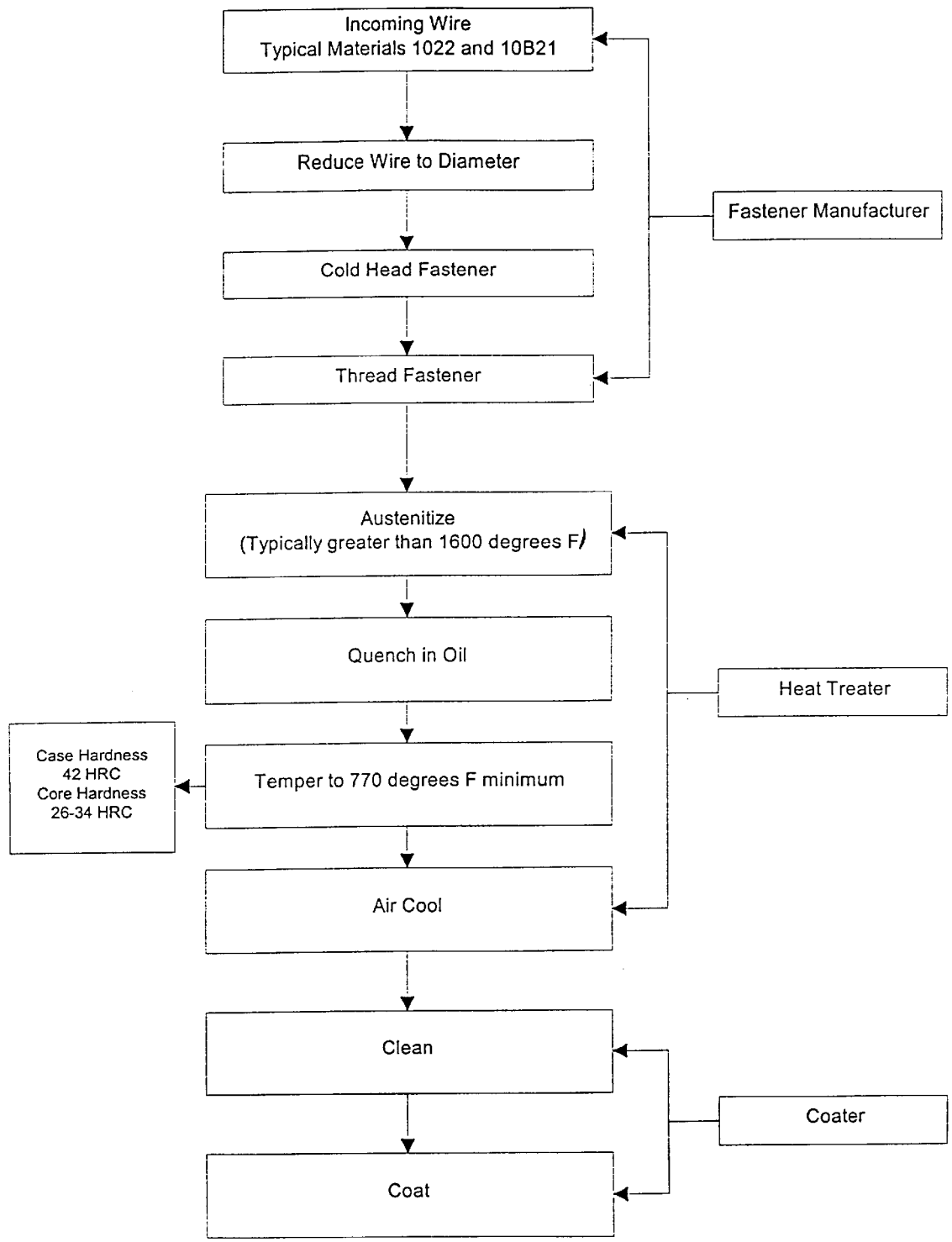
FIG. 3 is a flow chart of the method for producing the case hardened fastener.

As shown in FIG. 3, the fastener 10 is then cold headed in a conventional manner and threaded. The fastener 10 is then gas carburized at approximately 1550° F. or carbonitrided at about 1700° F. and quenched to room temperature. The fastener 10 is then tempered at a temperature greater than 770° F. for approximately an hour, or more particularly, 800° F. for the greatest benefit. The exact tempering temperature minimum is dependent on the material and material response to stress corrosion testing. The fasteners are then cooled to room temperature. After heat treatment, fasteners can be coated with a variety of coatings, such as tin, tin zinc, nickel, etc, using standard plating and coating processes such as mechanical plating, electroplating, spray, etc.

Testing has shown that fasteners subject to the method of production and heat treat regime as described in the current invention are not susceptible to hydrogen embrittlement and stress corrosion cracking. FIG. 4 shows the stress corrosion cracking test results of 10B21 case hardened fasteners. The fasteners were testing in bending in air and then in a 3.5% salt water solution under an imposed potential of −1.2 volts. The bending load was incrementally increased in steps of 5% of the ultimate bending strength of the fastener. At tempering temperatures above 770° F., the stress corrosion fracture strength approaches that of the fracture strength in air indicating a substantial reduction in susceptibility to hydrogen embrittlement and stress corrosion cracking. At a tempering temperature of 800° F., susceptibility to hydrogen embrittlement and stress corrosion cracking is eliminated.

It will thus be seen that the objects set forth above, among those made apparent in the preceding description are effectively attained and, since certain changes may be made in carrying out the above method and in the articles set forth without departing from the spirit and scope of the invention, it is intended that all matter contained in the above description and shown in the accompanying drawings shall be interpreted as illustrated and not in a limited sense.

What is claimed is:

1. A method for producing a case hardened thread producing fastener comprising the steps of:

providing a wire of a first diameter; reducing the wire diameter to a second diameter, forming a fastener blank;

cold heading the fastener blank;

threading the fastener blank;

case hardening the fastener in one of a gas carburizing atmosphere at a temperature around 1700° F. and a carbonitriding atmosphere at a temperature around 1550° F.;

quenching the fastener blank;

tempering the fastener at a temperature greater than approximately 770° F. and less than 1000° F. for approximately one hour.

2. The method as described in claim 1 wherein the fastener blank is tempered at a temperature greater than approximately 780° F. about one hour.

3. The method as described in claim 1 wherein the fastener is tempered at a temperature greater than approximately 800° F. about one hour.

4. The method as described in claim 1 wherein the wire of a first diameter is a steel selected from the group consisting of 1000 series alloys and 10B00 series alloys.

5. The method as described in claim 4 wherein the wire of a first diameter is a material selected from the group consisting of 1022, 1021, 10B22 and 10B21 steel.

6. The method as described in claim 1 wherein the wire of a first diameter is a steel selected from a group consisting of 1000 series alloys and 1500 series alloys.

7. The method as described in claim 6 wherein the wire of the first diameter is a steel selected from a group consisting of 1021, 1022, 1026, 1518, and 1525.

8. The method as described in claim 1 wherein the wire of a first diameter is a steel selected from a group consisting of 10B00 series alloys.

9. The method as described in claim 8 wherein the wire of the first diameter is a steel selected from a group consisting of 10B21, 10B22, and 10B26.

10. The method as described in claim 1 wherein the wire of a first diameter is a steel selected from a group consisting of 4000 series alloys, 5000 series alloys and 8000 series alloys.

11. The method as described in claim 10 wherein the wire of a first diameter is a material selected from the group consisting of 4023, 4120, 8620, 8622 and 5120 steel.

12. The method as described in claim 1 wherein the fastener is a self-tapping screw.

13. The method as described in claim 1 wherein the wire of a first diameter is a material selected from the group consisting of 10B21 and 10B22 steel.

* * * * *